US010996946B2

(12) United States Patent
Joyce et al.

(10) Patent No.: US 10,996,946 B2
(45) Date of Patent: May 4, 2021

(54) STATIC AND RUNTIME ANALYSIS OF COMPUTER PROGRAM ECOSYSTEMS

(71) Applicant: Ab Initio Technology LLC, Lexington, MA (US)

(72) Inventors: John Joyce, Newton, MA (US); Marshall A. Isman, Newton, MA (US); Sam Kendall, Lexington, MA (US)

(73) Assignee: Ab Initio Technology LLC, Lexington, MA (US)

(*) Notice: Subject to any disclaimer, the term of this patent is extended or adjusted under 35 U.S.C. 154(b) by 0 days.

(21) Appl. No.: 16/746,392

(22) Filed: Jan. 17, 2020

(65) Prior Publication Data
US 2020/0371781 A1    Nov. 26, 2020

Related U.S. Application Data

(60) Provisional application No. 62/851,295, filed on May 22, 2019.

(51) Int. Cl.
*G06F 9/44*     (2018.01)
*G06F 8/75*     (2018.01)
(Continued)

(52) U.S. Cl.
CPC ............... *G06F 8/75* (2013.01); *G06F 8/60* (2013.01); *G06F 11/3664* (2013.01); *G06F 11/3688* (2013.01)

(58) Field of Classification Search
CPC ........................................................ G06F 8/75
(Continued)

(56) References Cited

U.S. PATENT DOCUMENTS 5,966,072 A     10/1999  Stanfill et al.
9,692,632 B2*   6/2017   Bhattacharya ........ G06F 9/5072
(Continued)

OTHER PUBLICATIONS

PCT International Search Report and Written Opinion in International Appln. No. PCT/US2020/033998, dated Oct. 14, 2020, 14 pages.

(Continued)

*Primary Examiner* — Evral E Bodden
(74) *Attorney, Agent, or Firm* — Fish & Richardson P.C.

(57) ABSTRACT

A method for analyzing a computer program ecosystem including multiple computer programs includes performing a static analysis of the ecosystem, including identifying static dependencies among elements of the ecosystem based on values of parameters in one or more parameter sets associated with the ecosystem, the elements of the ecosystem including the computer programs of the ecosystem and data resources associated with the computer programs. The method includes performing a runtime analysis of the ecosystem, including identifying elements of the ecosystem that were utilized during execution of the ecosystem to process data records. The method includes performing a schedule analysis of the ecosystem, including identifying a computer program of the ecosystem that has a schedule dependency from another computer program of the ecosystem. The method includes identifying a subset of the elements of the ecosystem as an ecosystem unit based on the results of the static, runtime, and schedule analyses.

28 Claims, 12 Drawing Sheets

(51) Int. Cl.
*G06F 8/60* (2018.01)
*G06F 11/36* (2006.01)

(58) Field of Classification Search
USPC .......................................................... 717/123
See application file for complete search history.

(56) References Cited

U.S. PATENT DOCUMENTS

| | | | |
|---|---|---|---|
| 9,736,013 B2 * | 8/2017 | Markley | H04L 41/12 |
| 10,249,014 B2 * | 4/2019 | Bala | G06F 11/1446 |
| 2007/0011668 A1 | 1/2007 | Wholey et al. | |
| 2011/0145650 A1 | 6/2011 | Krauss | |
| 2011/0258611 A1 | 10/2011 | Unita et al. | |
| 2013/0219057 A1 | 8/2013 | Li et al. | |
| 2015/0347600 A1 * | 12/2015 | Tabe | G06F 16/9535 707/710 |
| 2016/0019057 A1 | 1/2016 | Bach et al. | |

OTHER PUBLICATIONS

U.S. Appl. No. 10/318,283, filed Jun. 11, 2019, Bach et al.

\* cited by examiner

US 10,996,946 B2

STATIC AND RUNTIME ANALYSIS OF COMPUTER PROGRAM ECOSYSTEMS

CLAIM OF PRIORITY

This application claims priority under 35 U.S.C. § 119(e) to U.S. Patent Application Ser. No. 62/851,295, filed on May 22, 2019, the entire contents of which are hereby incorporated by reference.

BACKGROUND

Data processing systems can include multiple computer programs that can be executed to process input data. Within a data processing system, data can be passed from one computer program to another before generating a set of output data.

SUMMARY

We describe here approaches to analyzing computer programs and associated data resources (referred to here as a computer program ecosystem) to identify a subset of the computer programs and data resources as an ecosystem unit, and to performing one or more system tasks using the ecosystem unit identified by the analysis. The computer programs and data resources in the ecosystem unit can be identified based on their static dependencies and/or runtime dependencies on one another. When the computer program ecosystem is executed, certain ones of the computer programs are executed, and certain data resources are accessed by the executing ones of the computer programs. By comparing the static dependencies with information indicative of which computer programs were executed and which data resources were accessed, the ecosystem unit can be identified. Treating the computer programs and data resources that form the ecosystem unit as a single entity for performing system tasks, such as migration from one computing system to another or testing of the computer program ecosystem, can facilitate the system tasks. By treating the ecosystem unit as a whole for the system task, system's computing data resources (e.g. memory, processing power, processing time) can be conserved while enabling including of all relevant elements of the computer program ecosystem into the performing of the system task, e.g., thereby enabling more efficient performing of the system task that consumes less processing power.

In an aspect, a computer-implemented method for analyzing a computer program ecosystem including multiple computer programs includes performing a static analysis of the computer program ecosystem, including identifying static dependencies among elements of the computer program ecosystem based on values of parameters in one or more parameter sets associated with the computer program ecosystem, the elements of the computer program ecosystem including the multiple computer programs of the computer program ecosystem and data resources associated with the computer programs. The method includes performing a runtime analysis of the computer program ecosystem, including identifying one or more of the elements of the computer program ecosystem that were utilized during execution of the computer program ecosystem to process data records. The method includes performing a schedule analysis of the computer program ecosystem, including identifying a computer program of the computer program ecosystem that has a schedule dependency from another computer program of the computer program ecosystem. The method includes identifying a subset of the elements of the computer program ecosystem as an ecosystem unit based on the results of the static analysis, the runtime analysis, and the schedule analysis. The method includes migrating the ecosystem unit from a first computer system to a second computer system, testing the ecosystem unit, or both.

Embodiments can include any combination of one or more of the following features.

Performing the runtime analysis includes obtaining runtime log information generated by execution of the computer program ecosystem; and analyzing the runtime log information to identify the one or more elements of the computer program ecosystem that were utilized during execution of the computer program ecosystem. Analyzing the runtime log information includes analyzing the values of parameters in the runtime log information to identify one or more computer programs that were executed during execution of the computer program ecosystem. Identifying the subset of elements as the ecosystem unit includes identifying the computer programs that were executed during execution of the computer program ecosystem as parts of the ecosystem unit. Identifying one or more computer programs of the computer program ecosystem that were executed during execution of the computer program ecosystem includes identifying runtime dependencies among the executed computer programs. Identifying the runtime dependencies among the executed computer programs includes identifying the runtime dependencies based on the values of the parameters in the runtime log information. Analyzing the values of the parameters in the runtime log information includes generalizing one or more of the values. Analyzing the runtime log information includes analyzing the values of parameters in the runtime log information to identify one or more data resources that were accessed during execution of the computer program ecosystem. The method includes analyzing the values of the parameters in the runtime log information to determine the name of each data resource that was accessed during execution of the computer program ecosystem. Identifying the subset of elements as the ecosystem unit includes identifying the data resources that were accessed during execution of the computer program ecosystem as parts of the ecosystem unit.

Identifying a subset of the elements of the computer program ecosystem as an ecosystem unit includes including, in the ecosystem unit, the one or more elements that were utilized during execution of the computer program ecosystem.

Performing a schedule analysis includes obtaining schedule information from a scheduler, in which the scheduler is distinct from the computer program ecosystem.

Performing a schedule analysis includes identifying a first computer program of the computer program ecosystem that is scheduled to be executed after execution of a second computer program of the computer program ecosystem. Identifying the subset of elements as the ecosystem unit includes identifying the first computer program and the second computer program as part of the ecosystem unit.

The method includes executing the computer program ecosystem to process data. Executing the computer program ecosystem includes instantiating one or more of the computer programs of the computer program ecosystem according to values of parameters in one or more of the parameter sets associated with the computer program ecosystem. Executing the computer program ecosystem includes executing the one or more instantiated computer programs to process the data. The runtime log information includes information indicative of the one or more executed instantiated computer programs. Executing the computer program ecosystem includes accessing one or more of the data resources associated with the computer program ecosystem. The runtime log information includes information indicative of the one or more accessed data resources. Accessing a data resource associated with the computer program ecosystem includes reading data from one or more of a file, a database, and an object. Accessing a data resource associated with the computer program ecosystem includes writing data to one or more of a file, a database, and an object. Executing the computer program ecosystem includes generating the runtime log information. Generating the runtime log information includes writing the runtime log information to a log file.

The one or more computer programs include dataflow graphs.

In an aspect, a computer system for analyzing a computer program ecosystem including multiple computer programs includes one or more processors coupled to a memory. The one or more processors are configured to perform a static analysis of the computer program ecosystem, including identifying static dependencies among elements of the computer program ecosystem based on values of parameters in one or more parameter sets associated with the computer program ecosystem, the elements of the computer program ecosystem including the multiple computer programs of the computer program ecosystem and data resources associated with the computer programs. The one or more processors are configured to perform a runtime analysis of the computer program ecosystem, including identifying one or more of the elements of the computer program ecosystem that were utilized during execution of the computer program ecosystem to process data records. The one or more processors are configured to perform a schedule analysis of the computer program ecosystem, including identifying a computer program of the computer program ecosystem that has a schedule dependency from another computer program of the computer program ecosystem. The one or more processors are configured to identify a subset of the elements of the computer program ecosystem as an ecosystem unit based on the results of the static analysis, the runtime analysis, and the schedule analysis. The one or more processors are configured to migrate the ecosystem unit from a first computer system to a second computer system, testing the ecosystem unit, or both.

In an aspect, a computer readable medium stores instructions for causing a computer system to analyze a computer program ecosystem including multiple computer programs. The instructions cause the computer system to perform a static analysis of the computer program ecosystem, including identifying static dependencies among elements of the computer program ecosystem based on values of parameters in one or more parameter sets associated with the computer program ecosystem, the elements of the computer program ecosystem including the multiple computer programs of the computer program ecosystem and data resources associated with the computer programs. The instructions cause the computer system to perform a runtime analysis of the computer program ecosystem, including identifying one or more of the elements of the computer program ecosystem that were utilized during execution of the computer program ecosystem to process data records. The instructions cause the computer system to perform a schedule analysis of the computer program ecosystem, including identifying a computer program of the computer program ecosystem that has a schedule dependency from another computer program of the computer program ecosystem. The instructions cause the computer system to identify a subset of the elements of the computer program ecosystem as an ecosystem unit based on the results of the static analysis, the runtime analysis, and the schedule analysis. The instructions cause the computer system to migrate the ecosystem unit from a first computer system to a second computer system, testing the ecosystem unit, or both.

In an aspect, a computer system for analyzing a computer program ecosystem including multiple computer programs includes means for performing a static analysis of the computer program ecosystem, including identifying static dependencies among elements of the computer program ecosystem based on values of parameters in one or more parameter sets associated with the computer program ecosystem, the elements of the computer program ecosystem including the multiple computer programs of the computer program ecosystem and data resources associated with the computer programs. The computer system includes means for performing a runtime analysis of the computer program ecosystem, including identifying one or more of the elements of the computer program ecosystem that were utilized during execution of the computer program ecosystem to process data records. The computer system includes means for performing a schedule analysis of the computer program ecosystem, including identifying a computer program of the computer program ecosystem that has a schedule dependency from another computer program of the computer program ecosystem. The computer system includes means for identifying a subset of the elements of the computer program ecosystem as an ecosystem unit based on the results of the static analysis, the runtime analysis, and the schedule analysis. The computer system includes means for migrating the ecosystem unit from a first computer system to a second computer system, testing the ecosystem unit, or both.

The details of one or more implementations are set forth in the accompanying drawings and the description below. Other features and advantages will be apparent from the description and drawings, and from the claims.

DETAILED DESCRIPTION

Figure 1A:
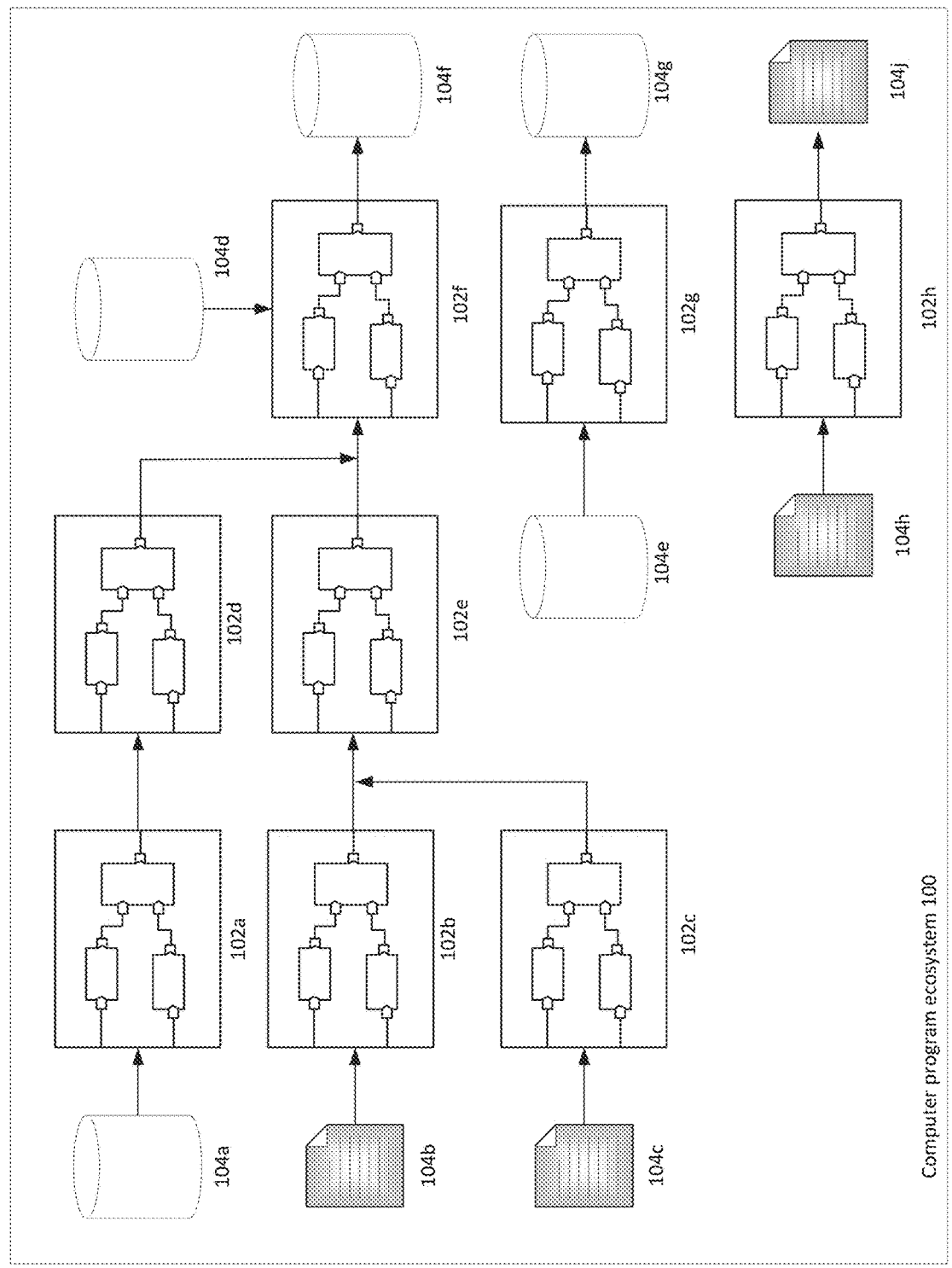
FIGS. 1A-1D are diagrams of a computer program ecosystem.

We describe here approaches to analyzing a computer program ecosystem that includes multiple computer programs and with which multiple data resources are associated to identify a subset of the computer programs and data resources as an ecosystem unit. A computer program ecosystem is a set of multiple computer programs along with data resources that are associated with the computer programs. A data resource is a data repository, such as a source of data (e.g., data records) for processing by one or more of the computer programs in the computer program ecosystem, to be used as reference data during processing by one or more of the computer programs in the computer program ecosystem, or a destination for data (e.g., data records) following processing of the data by one or more of the computer programs in the computer program ecosystem. An ecosystem unit is identified based on results of static, runtime, and schedule analyses of the computer program ecosystem indicative of dependencies among the elements of the computer program ecosystem. A system task, such as migration of computer programs and resources or testing of computer programs, can be carried out using the ecosystem unit rather than the entire computer program ecosystem, thereby conserving system resources such as processing power or memory.

The computer programs and data resources of the computer program ecosystem can have static dependencies on one another. A static dependency between two elements (e.g., computer programs and/or data resources) is a dependency that is defined by values in previously stored parameter sets associated with the computer program ecosystem. Static dependencies among elements of the computer program ecosystem can be identified by a static analysis of the values in the stored parameter sets.

The computer programs and data resources of the computer program ecosystem can also have dependencies on one another that are not defined until runtime of the computer program ecosystem. When the computer program ecosystem is executed to process data records, an execution command can include parameter values, e.g., in addition to or instead of parameter values in the previously stored parameter sets that define the static dependencies. Runtime logs generated during execution of the computer program ecosystem, can indicate these parameter values, which indicate which computer programs were executed, which data resources were accessed. A runtime analysis, e.g., an analysis of runtime logs, can identify dependencies among elements of the computer program ecosystem that were not apparent from the static analysis.

The computer programs of the computer program ecosystem can also have schedule dependencies on one another. Execution of the computer program ecosystem to process data records can be controlled by a scheduler that prescribes when certain elements (e.g., computer programs) are to be executed. In some cases, the scheduler can prescribe that a first computer program or group of computer programs is to be executed following execution of a second computer program or group of computer programs. A schedule analysis, e.g., an analysis of scheduling information prescribed by the scheduler, can identify schedule dependencies among computer programs even if those computer programs do not have static or runtime dependencies from one another.

By comparing the static dependencies, the results of a runtime analysis, and the schedule dependencies, a complete picture of the dependencies among elements of the computer program ecosystem can be developed. Elements that depend from another element or from which another element depends are identified by way of the combination of static, runtime, and schedule analysis. These identified elements collectively form an ecosystem unit. Treating the computer programs and data resources that form the ecosystem unit as a single entity can facilitate system tasks, such as migration from one computing system to another or testing of the computer program ecosystem.

Referring to FIG. 1A, a computer program ecosystem 100 includes multiple computer programs 102a-102h (collectively referred to as computer programs 102). At least some of the computer programs 102 statically depend from one or more other of the computer programs 102. For instance, a computer program 102d receives, as input, data (e.g., data records) processed by and output from a computer program 102a upstream of the computer program 102d. A static dependency is a dependency that can be determined in a static analysis prior to runtime of the computer program, e.g., based on an analysis of the stored parameter values or source code associated with the computer program.

In the example of FIG. 1A, the computer programs 102 of the computer program ecosystem 100 are dataflow graphs. A dataflow graph is an executable computer program in the form of a graph that can include nodes, which are executable data processing components and data resources such as data sources and data sinks. Data resources can be, for example, files, database tables, or other types of data sources or sinks that can provide data (e.g., data records) for processing by the graph or receive data processed by the data processing components of the graph. Data processing components and data resources are sometimes collectively referred to as nodes of the graph. A link connecting two nodes of a graph is provided for a flow of information, such as data or control signals, between the nodes. Such dataflow graphs (sometimes referred to as graphs) can be data processing graphs or plans that control execution of one or more graphs. Dataflow graphs can be executed to carry out processing of the information. In some examples, one or more data processing components of a dataflow graph can be a sub-graph.

One or more data resources 104a-104j (collectively referred to as data resources 104) can be associated with the computer program ecosystem 100. A data resource is a data repository, e.g., a source of data to be processed or used during processing by the computer program ecosystem (e.g. during processing by the computer programs of the computer program ecosystem), or a destination for data output by the computer program ecosystem. Examples of data resources include files, databases (e.g., tables of databases), queues, objects, and other types of data resources. By accessing a resource, we mean that data is read from or written to the data resource. At least some of the data resources 104 statically depend from one or more of the computer programs 102 of the computer program ecosystem 100, or at least some of the computer programs 102 statically depend from one or more of the data resources 104, or both. For instance, stored parameter values can indicate static dependencies among a computer program 102a and data resources 104a, 104f: data from the data resource 104a is provided as input to the related computer program 102a, which in turn outputs data records to the data resource 104f.

The static dependencies among the elements of the computer program ecosystem (e.g., the computer programs 102 in the computer program ecosystem 100 and the data resources 104 associated with the computer program ecosystem 100) are specified by one or more parameter sets associated with the computer program ecosystem 100. The parameter sets can be associated with specific computer programs 102, with specific resources 104, or generally with the computer program ecosystem 100. A parameter set can be defined by a file associated with the respective computer program 102, resource 104, or ecosystem 100, the file containing values (or information usable to determine values) for parameters of the parameter set. A static analysis of the computer program ecosystem can be performed to identify the static dependencies among the elements of the computer program ecosystem based on resolved parameter values for the parameters in the parameter sets, as discussed below.

Figure 1B:
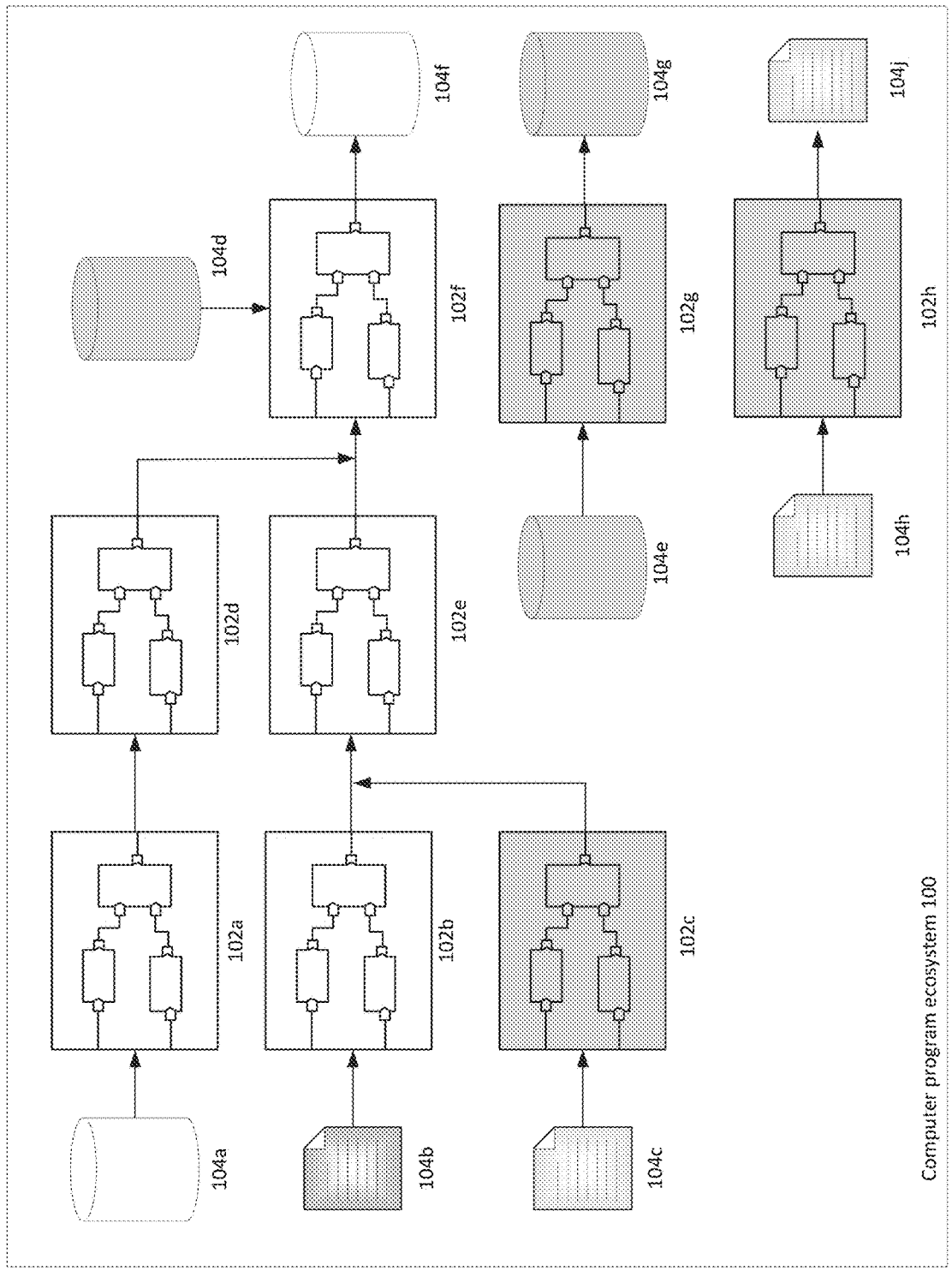

Referring to FIG. 1B, the computer program ecosystem 100 can be executed to process input data, such as input data records. Not all of the elements (e.g., computer programs 102 and data resources 104) of the computer program ecosystem 100 are necessarily utilized in the processing of a given set of input data. For instance, fewer than all of the computer programs 102 of the computer program ecosystem 100 can be executed, and/or fewer than all of the data resources 104 associated with the computer program ecosystem 100 can be accessed, during execution of the computer program ecosystem 100.

In the example of FIG. 1B, the computer programs 102a, 102b, and 102d-102f are executed and the data resources 104a, 104b, and 104f are accessed during execution of the computer program ecosystem 100 to process the input data 110. The other elements (e.g., the computer program 102c, 102g, and 102h and data resources 104c, 104d, 104e, and 104g-104j) are not utilized, as shown by the gray shading in FIG. 1B.

A computer program ecosystem is executed responsive to an execution command that can receive parameter values as arguments supplied to the execution command, e.g., in addition to or instead of from previously stored parameter sets. The static analysis of a computer program ecosystem determines static dependencies based only on stored parameter sets; as such, parameter sets associated with parameter values originating from arguments supplied to an execution command are not represented in the static dependencies determined in the static analysis. Identification of an ecosystem unit based solely on a static analysis can thus result in an incomplete or incorrect identification of the elements that make up the ecosystem unit.

A runtime analysis can be performed to identify the elements of the computer program ecosystem 100 that are utilized during execution of the computer program ecosystem 100, thereby supplementing the characterization of the computer program ecosystem provided by the static analysis. During execution of the computer program ecosystem 100, runtime log information is generated that indicates values of parameters in one or more of the parameter sets associated with the computer program ecosystem 100. A runtime analysis involves analyzing the values of the parameters in the runtime log information to identify the elements that were utilized during execution of the computer program ecosystem. For instance, during execution of the computer program ecosystem, log information written to a file or table can include identifiers of the elements of the computer program ecosystem that were executed or accessed. A runtime analysis can interpret the log information to obtain a list of elements that were executed or accessed during execution.

In some examples, execution of a computer program ecosystem 100 can be controlled by a scheduler. In some examples, the execution can be scheduled at specific times (e.g., a credit card record processing ecosystem can be scheduled to execute at 11:00 pm nightly; a telephone record processing ecosystem can be scheduled to execute at 2:00 am on Saturdays). In some examples, execution can be scheduled such that one or more computer programs of the computer program ecosystem are scheduled to execute before or after one or more other computer programs of the computer program ecosystem, which is referred to as a schedule dependency. In some examples, the scheduling dependencies of computer programs 102 can be taken into account in the identification of an ecosystem unit. For instance, computer programs with a schedule dependency can be included in the ecosystem unit even if those computer programs are not identified in the static or runtime analysis of the computer program ecosystem 100.

Figure 1C:
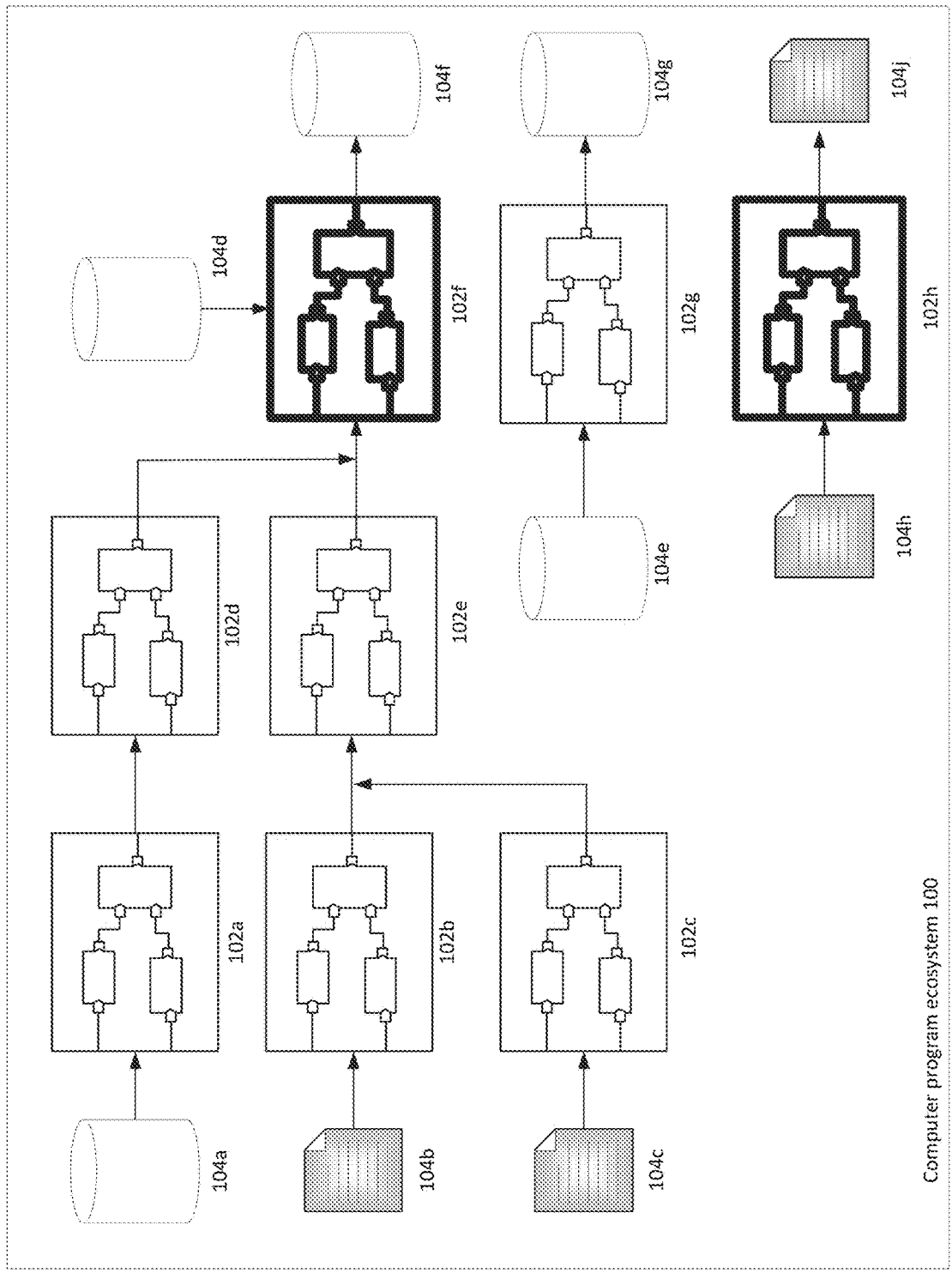

Referring to FIG. 1C, a schedule analysis can identify computer programs in the computer program ecosystem 100 that have schedule dependencies on one another. In the example of FIG. 1C, a schedule analysis reveals that the computer program 102h has a schedule dependency on the computer program 102f, meaning that the computer program 102h is scheduled to run after the computer program 102f has completed its execution.

In some examples, a schedule analysis can capture dependencies among computer programs 102 that are not reflected by either a static analysis or a runtime analysis. In the example of FIG. 1C, the computer program 102h has a schedule dependency, but not a static dependency, on the computer program 102f. In addition, as shown in FIG. 1B, a runtime dependency was not identified between the computer program 102h and the computer program 102f. This can be, for instance, because the scheduling of computer program 102h as executing after the computer program 102f only pertains to certain days of the week, and thus was not captured by the runtime analysis.

Figure 1D:
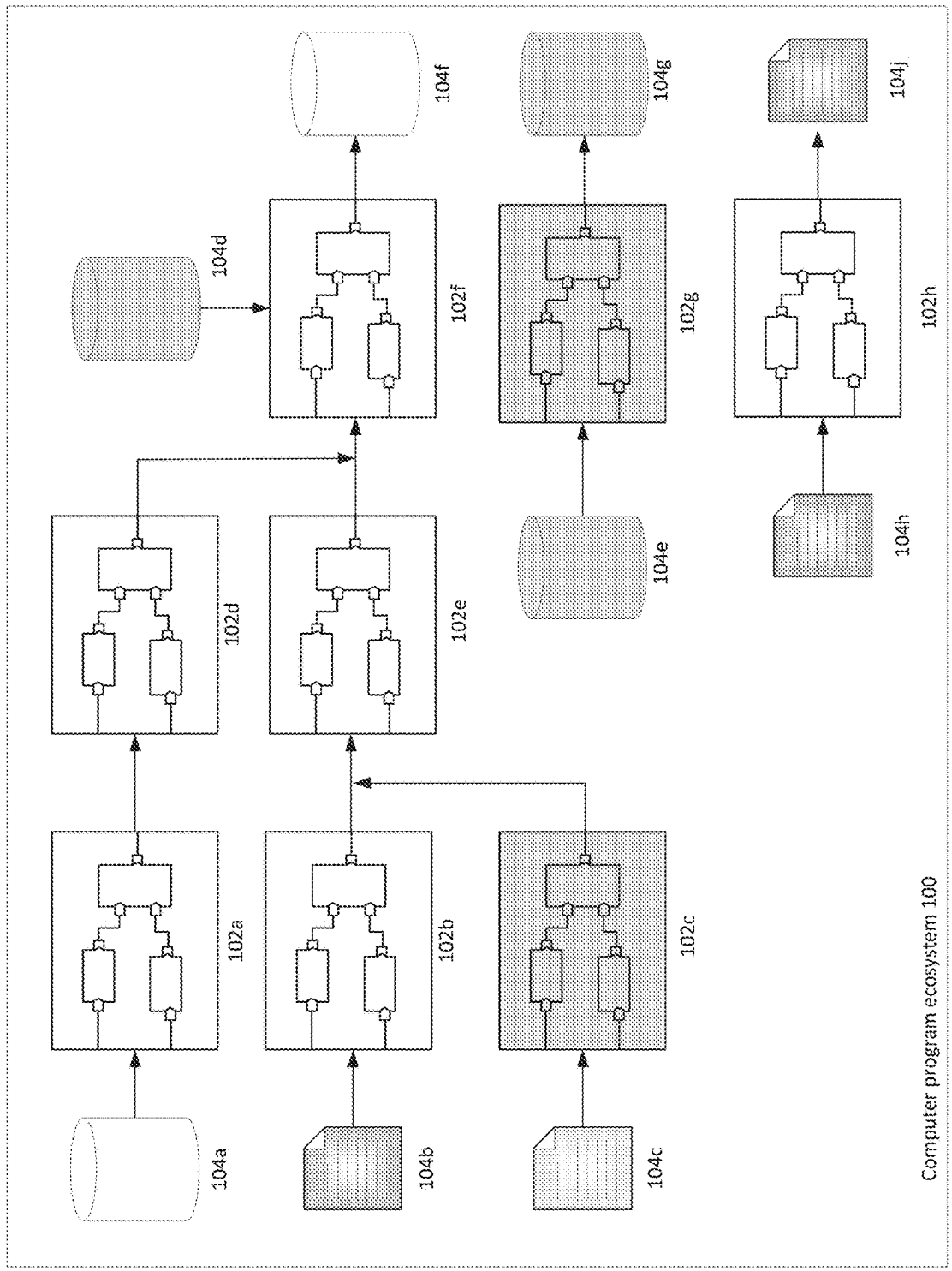

The results of a static analysis, a runtime analysis, and a schedule analysis of the computer program ecosystem can be used to identify a subset of the elements of the computer program ecosystem as an ecosystem unit. For instance, the elements that are utilized during execution of the computer program ecosystem, in addition to any other elements that are statically dependent on the utilized elements or any other elements from which the utilized elements are statically dependent, and any elements that share a schedule dependency with a utilized element, can form an ecosystem unit. Referring to FIG. 1D, in the computer program ecosystem 100, the computer programs 102xxx and the resources 104xxx form an ecosystem unit. These computer programs and resources were identified by way of static and runtime analysis (FIGS. 1A and 1B) and schedule analysis (FIG. 1C). The remaining computer programs 102xx and resources 104xx (shaded in gray) are not part of the ecosystem unit.

A user, such as a system developer or system engineer, or an automated computer-implemented operation, may sometimes perform a system task using the computer program ecosystem, such as testing of the computer program ecosystem, migration of the computer program ecosystem from one computing system to another, or archiving or elimination of unused code from the computer program ecosystem. To conserve system resources (e.g., processing or memory capacity) while ensuring that all appropriate elements of the computer program ecosystem are addressed in a given system task, the system task can be performed using an ecosystem unit rather than using the computer program ecosystem as a whole.

Figure 2:
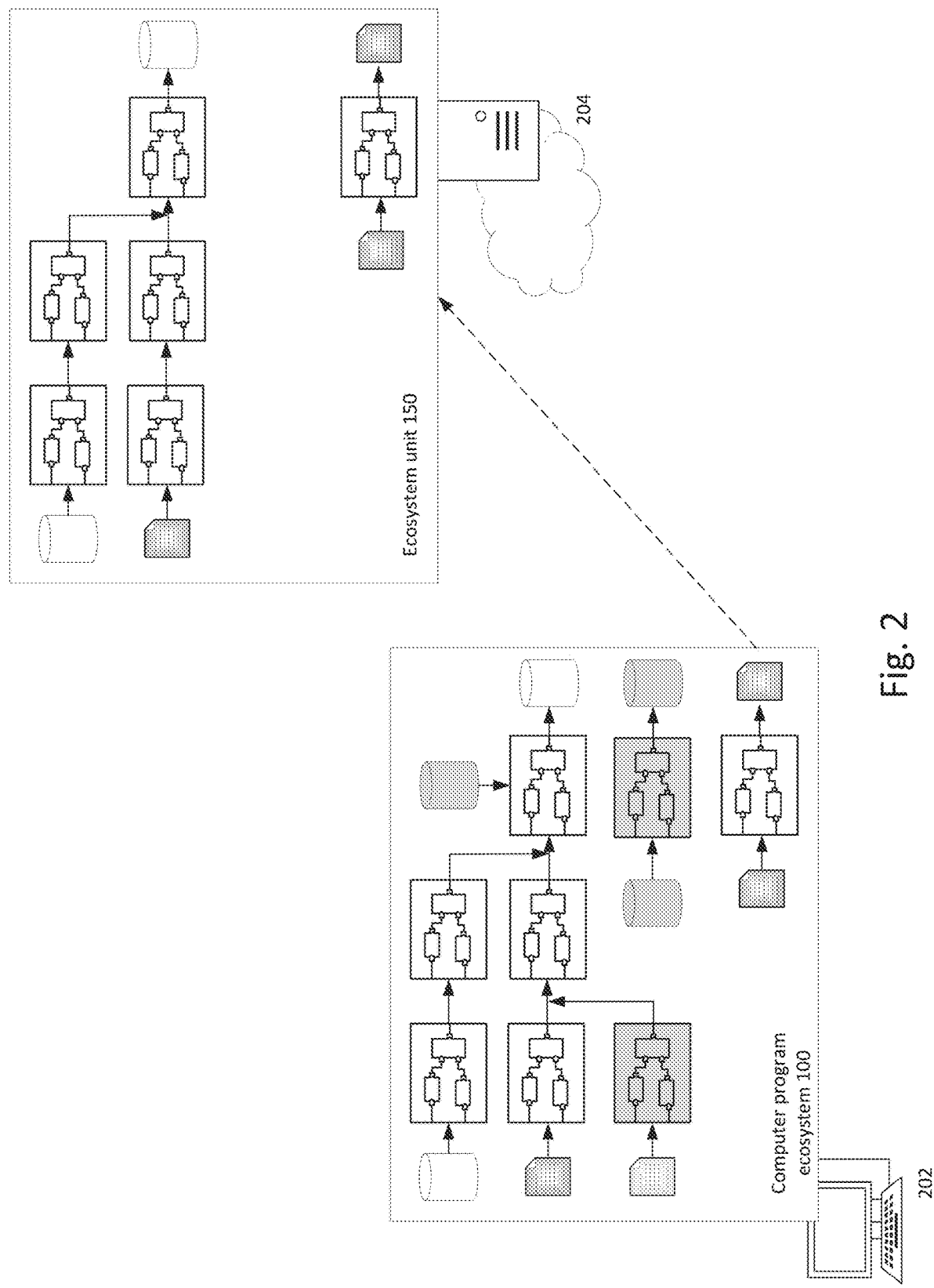
FIG. 2 is a diagram of migration of an ecosystem unit.

FIG. 2 depicts an example of migration of the computer program ecosystem 100 from a first computing system 202 to a second, cloud-based computing system 204. To migrate the computer program ecosystem 100, only the elements of the computer program ecosystem that were identified as part of an ecosystem unit 150 of the computer program ecosystem are migrated from the first computing system 202 to the second computing system 204. Migration of the entire computer program ecosystem 100 from the first computing system 202 to the second computing system 204 can be a costly process, e.g., in terms of time, bandwidth, memory, or other factors. Migration of portions of the computer program ecosystem 100, without an understanding of the relationships among the elements of the computer program ecosystem 100 or the status of each element during execution of the computer program ecosystem 100, can result in a failure to migrate all elements that are relevant to a given task. By migrating the ecosystem unit 150 as a whole while not migrating elements that do not form part of the ecosystem unit, system resources can be conserved while enabling migrating of all relevant elements of the computer program ecosystem.

Figure 3:
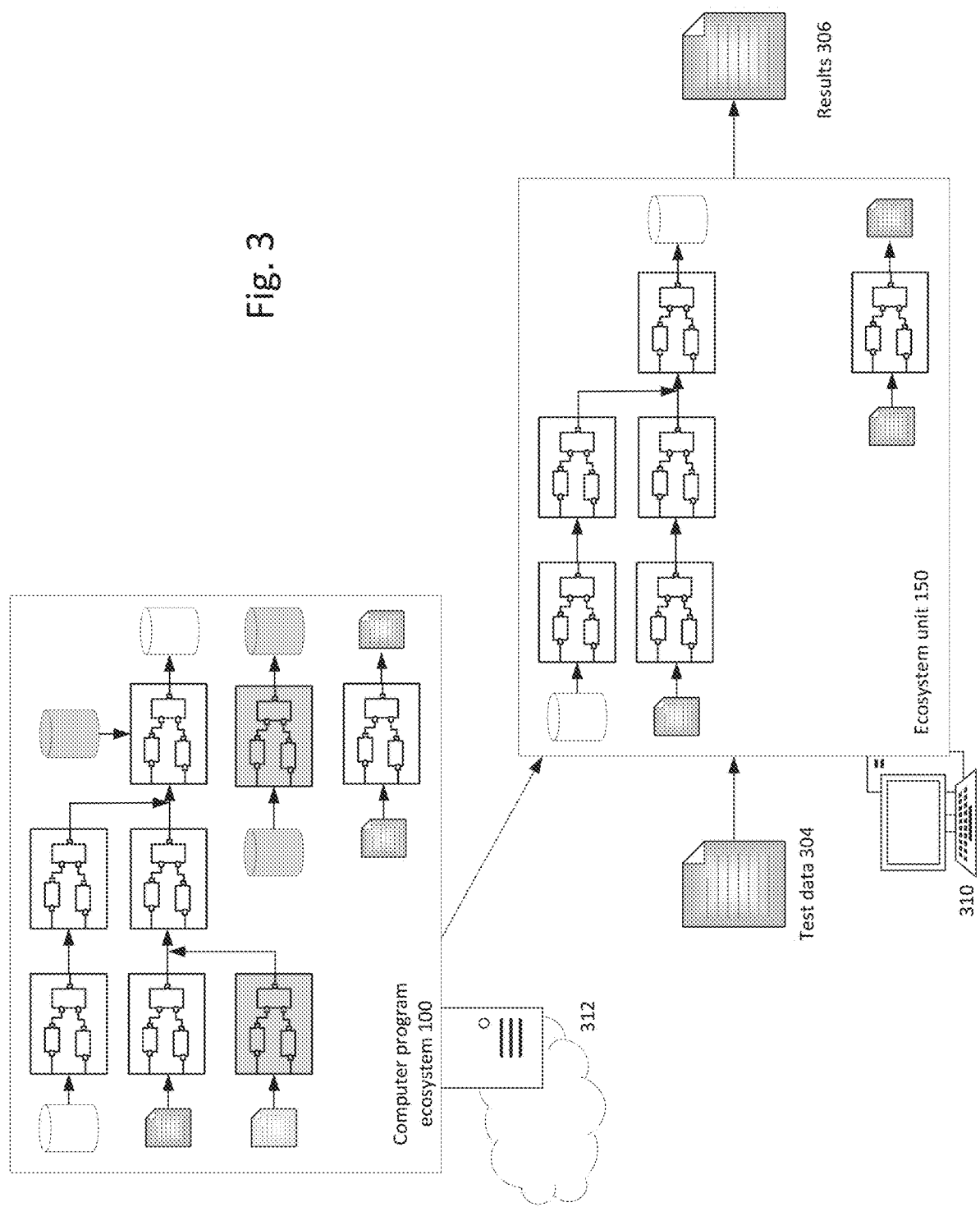
FIG. 3 is a diagram of testing of an ecosystem unit.

FIG. 3 depicts an example of testing of the computer program ecosystem 100. The computer program ecosystem 100 can implement one or more data processing rules (e.g. specified and applied by the computer programs), each of which operates on at least one input value and generates at least one output value. Whether a given data processing rule is executed during processing of a set of data, e.g., during processing of a given data record, can depend, directly or indirectly, on a value in the set of data, such as a value in each of one or more fields of the data record.

To test a computer program ecosystem 100, resources, such as data sources (e.g., files or tables), are copied onto a lower environment 310, e.g., from a server 312 hosting the computer program ecosystem 100, and testing proceeds at the lower environment using instantiations of the computer programs of the computer program ecosystem 100. To provide for more efficient preparation for testing of the computer program ecosystem 100, only those resources that are part of the ecosystem unit 150 of the computer program ecosystem 100 are copied onto the lower environment. The testing process can then proceed, with only those resources that are relevant to the testing having been copied.

In the testing process, test data 304, and not actual production data, are provided and processed by the computer program ecosystem 100, and test results 306 are output from the computer program ecosystem 100. The test data 304 is data especially prepared or selected for the testing and can include data sufficient to cause some or all of the data processing rules in the computer program ecosystem 100 (e.g., some or all of the data processing rules of the multiple computer programs 102 of the computer program ecosystem 100) to be executed. To make testing more efficient and less resource-intensive, the ecosystem unit 150 in the computer program ecosystem 100 can be identified prior to the testing, and test data 304 sufficient to cause some or all of the data processing rules (e.g. of the computer programs) in the ecosystem unit 150 to be executed. Because the ecosystem unit 150 can be less extensive than the entire computer program ecosystem 100, the amount and/or variety of test data sufficient to cause execution of the data processing rules in the ecosystem unit 150 can be less, thereby enabling more efficient testing that consumes less processing power.

Figure 4:
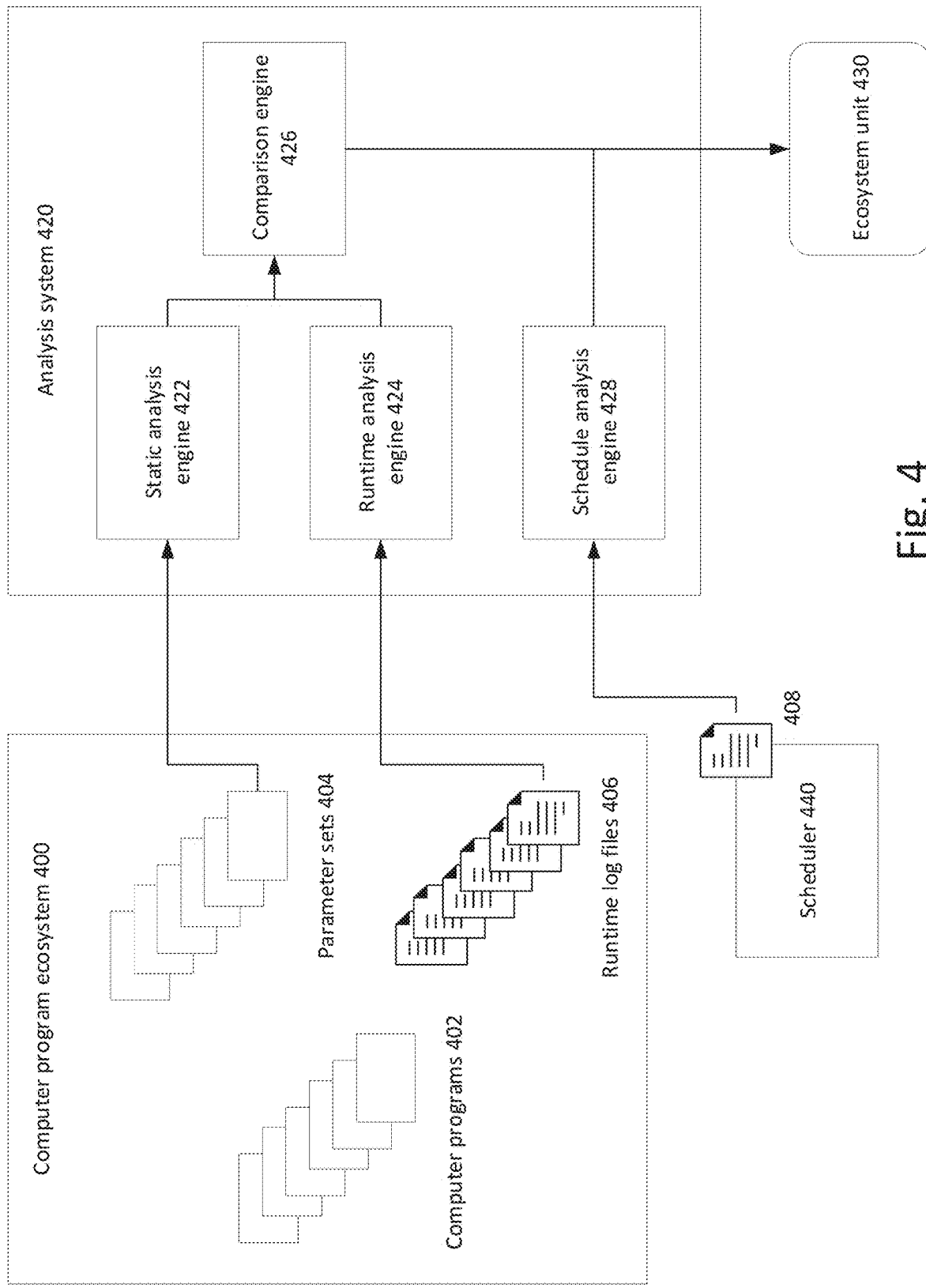
FIG. 4 is a diagram of a system for analyzing a computer program ecosystem.

Referring to FIG. 4, an example analysis system 420 performs static and runtime analysis and schedule analysis on a computer program ecosystem 400 to identify a subset of the elements of the computer program ecosystem 400 as an ecosystem unit 430. The computer program ecosystem 400 is hosted on a computing system 410 and includes multiple computer programs 402, e.g., dataflow graphs, and one or more data resources 408 are associated with the computer program ecosystem 400.

The analysis system 420 includes a static analysis engine 422 for identifying static dependencies among the elements of the computer program ecosystem 400, such as among the multiple computer programs 402 and the one or more data resources 408. The static analysis engine operates by instantiating the computer programs 402 of the computer program ecosystem 400 and resolving parameters in one or more parameter sets 404 associated with the computer program ecosystem. The static analysis engine 422 then analyzes the resolved parameter values to identify the static dependencies among the computer programs 402 and data resources 408. The output of the static analysis process is an identification of the static dependencies of the computer program ecosystem elements. In some examples, the static analysis process can produce a graphical data lineage diagram as an output.

When the computer program ecosystem 400 is executed to process a set of input data, e.g., data records, one or more runtime logs 406, such as runtime log files, are generated. The runtime logs 406 include parameter sets and associated resolved parameter values that are applicable at runtime of the computer program ecosystem 400, e.g., that are provided as input to the computer program ecosystem along with an execution command. The analysis system 420 includes a runtime analysis engine 424 for identifying the elements (e.g., computer programs 402 and data resources 408) of the computer program ecosystem 400 that were utilized during the execution by analysis of the parameter sets and associated resolved parameter values in the runtime logs 406.

The results of the analyses by the static analysis engine 422 and the runtime analysis engine 424 are provided to a comparison engine 426 for identification of the subset of elements of the computer program ecosystem 400 that form the ecosystem unit 430. The comparison engine 426 supplements the identification of the static dependencies produced by the static analysis by incorporating the parameter sets and associated resolved parameter values identified by the runtime analysis engine 424 to obtain an identification of all elements of the computer program ecosystem 400 that constitute the ecosystem unit 420, e.g., all elements that either have a static dependency to or from another element of the computer program ecosystem, all elements that are utilized during execution, and all elements that have a static dependency to or from each of the elements that is utilized during execution.

A schedule analysis engine 428 analyzes schedule dependencies among the computer programs 402 of the computer program ecosystem 400, e.g., by analysis of the parameter sets 404 or schedule information 408 associated with a scheduler 440. Elements of the computer program ecosystem 400 that are identified by the schedule analysis engine 428 as having schedule dependencies (e.g. with the elements already identified for the ecosystem unit) are also included in the ecosystem unit 430.

The identification of the ecosystem unit 430 can facilitate the performance of a system task, such as computer program testing or migration from one computer system to another.

Figure 5A:
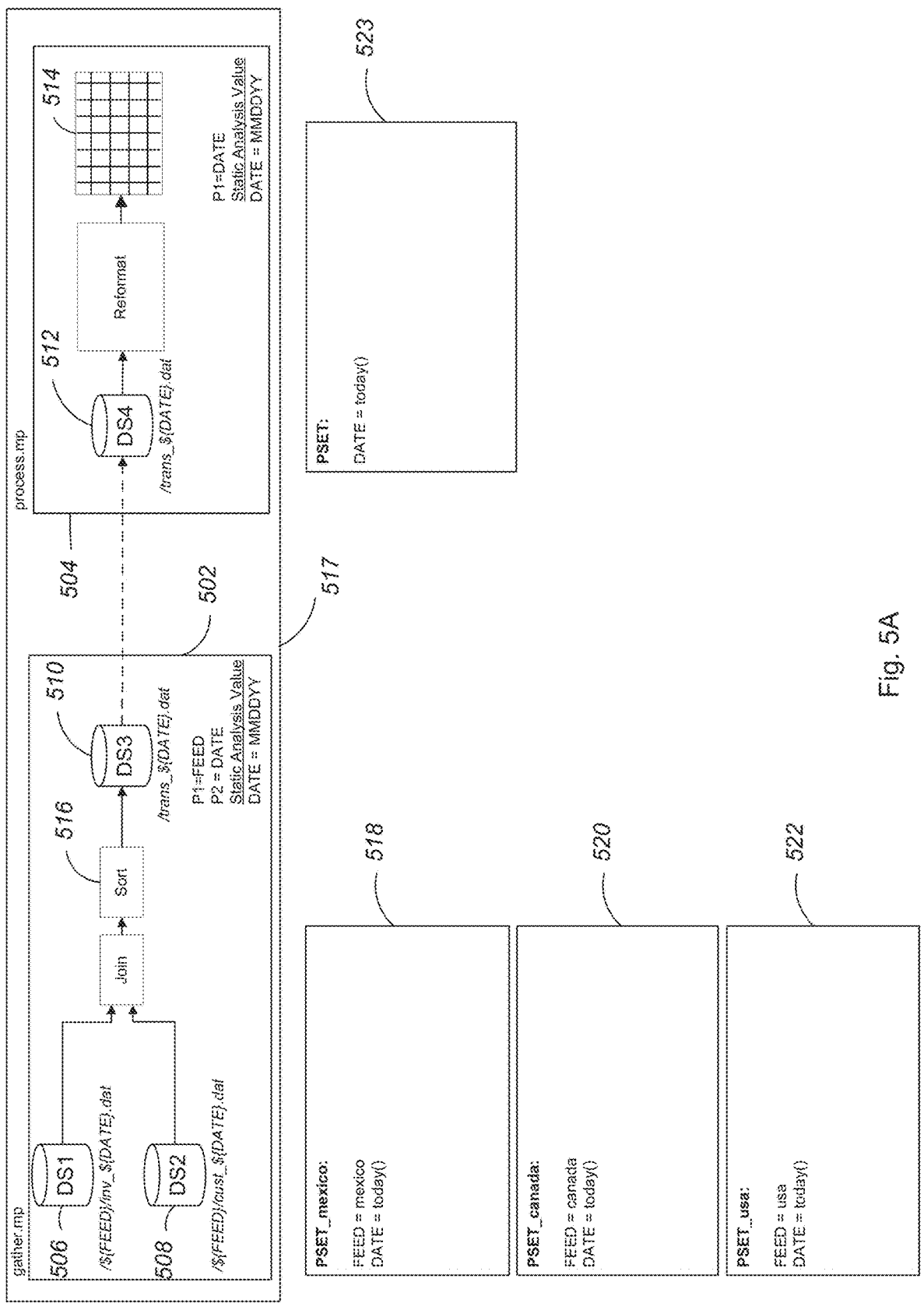
FIG. 5A is a dataflow graph.
Figure 5B:
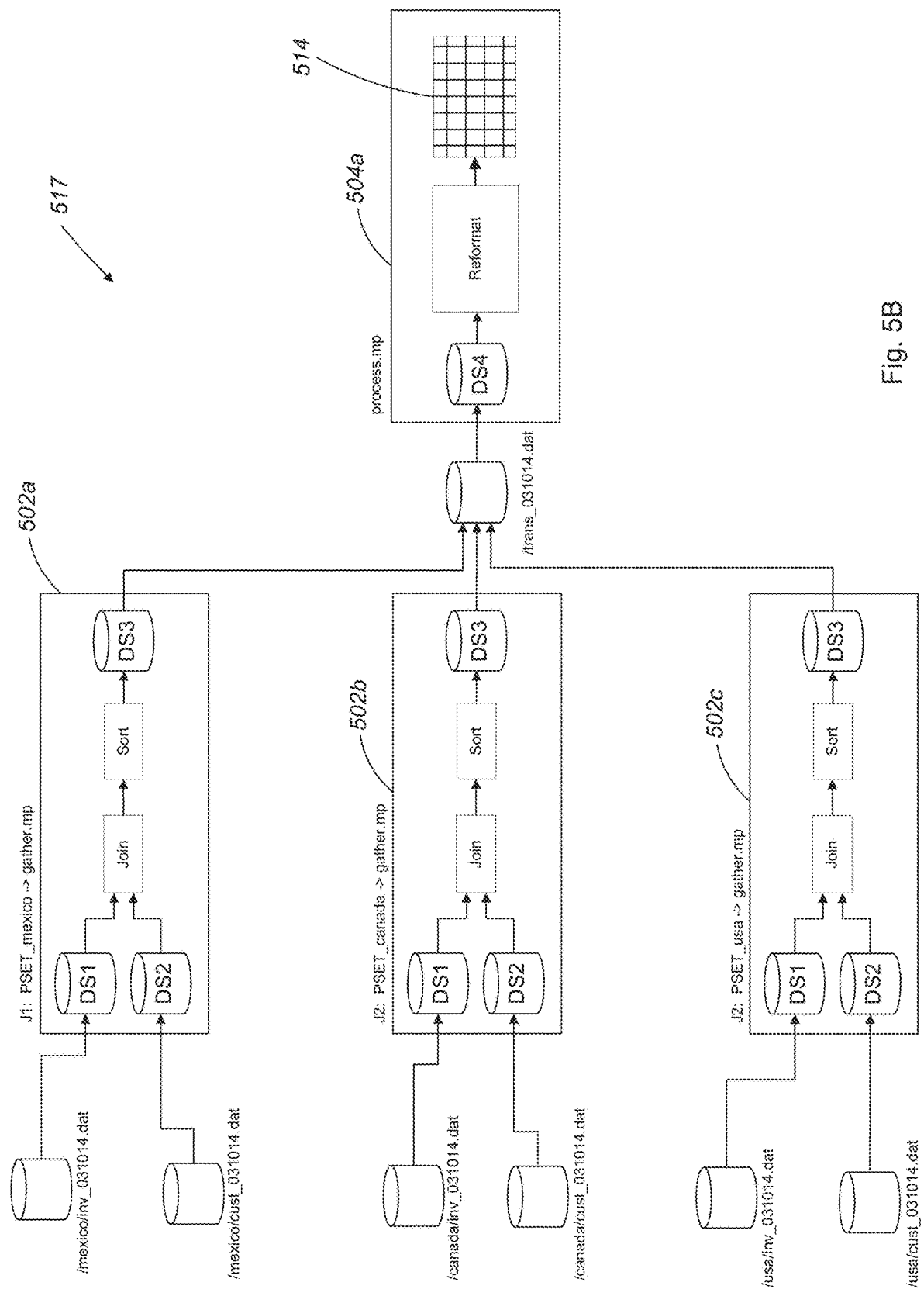
FIG. 5B is a runtime configuration of the dataflow graph of FIG. 5A.

FIGS. 5A and 5B depict an example approach to an analysis of static dependencies among elements of a computer program ecosystem. The example approach of FIGS. 5A and 5B includes the resolution of parameters for and instantiation of an example dataflow graph of a computer program ecosystem. Further description of static analysis can be found in U.S. Patent Application Publication No. US 2016/0019057, the contents of which are incorporated here by reference in their entirety.

Referring to FIG. 5A, an example of a dataflow graph 500 that forms part of a computer program ecosystem includes a first sub-graph 502 named gather.mp and a second sub-graph 504 named process.mp.

The first sub-graph 502 receives a first logical dataset DS1 506 and a second logical dataset DS2 508 as input, processes the data from the first and second logical datasets 506, 508 and writes a result of the processing into a third logical dataset DS3 510. The second sub-graph 504 receives a fourth logical dataset DS4 512 (which happens to point to the same physical file as the third logical dataset 510) as input, processes the data from the fourth logical dataset 512, and writes the result of the processing to a table 514.

Each of the four logical datasets 506, 508, 510, 512 is associated with a parameterized path which, at run time, resolves to a path to a physical file. In particular, the first logical dataset 506 is identified using the parameterized path /${FEED}/inv_${DATE}.dat, the second logical dataset 508 is identified using the parameterized path /${FEED}/cust_${DATE}.dat, the third logical dataset 510 is identified using the parameterized path /trans_${DATE}.dat, and the fourth logical dataset 512 is identified using the parameterized path /trans_${DATE}.dat.

The first sub-graph 502 receives two parameters, P1=FEED and P2=DATE as arguments and, as is described in greater detail below, uses the parameters to resolve the paths to the respective physical locations of the first logical dataset 506, the second logical dataset 508, and the third logical dataset 510 by replacing the FEED and DATE placeholders in the parameterized paths with the values of the received FEED and DATE parameters. Additionally, the first sub-graph 502 includes a "static analysis" value for the DATE parameter. As is described in greater detail below, the static analysis value for the DATE parameter is a placeholder value which is used as the parameter value during static analysis of the dataflow graph 500 (i.e., when the data lineage of the dataflow graph 500 is determined).

Similarly, the second sub-graph 504 receives a single parameter P1=DATE and uses it to resolve the path to the physical location of the fourth logical dataset 512 by replacing the DATE placeholder in the parameterized path for the fourth logical dataset 512 with the value of the received DATE parameter. Additionally, the second sub-graph 504 includes a "static analysis" value for the DATE parameter. As is described in greater detail below, the static analysis value for the DATE parameter is a placeholder value which is used as the parameter value during static analysis of the dataflow graph 517 (i.e., when the data lineage of the dataflow graph 517 is determined).

Since the operation of the dataflow graph 500 and its sub-graphs depends on the parameters that it receives, the dataflow graph and its sub-graphs are sometimes referred to "generic" dataflow graphs or "generic" computer programs.

Parameters can be designated as either "design time" parameters or "run time" parameters. In addition to being used for path resolution as described above, design time parameters affect the logical operation of their associated dataflow graph. In contrast, run time parameters are supplied to the graph on a job-by-job basis and do not affect the logical operation of the graph. In some examples, the logical operation of a dataflow graph refers to both the functionality of the graph and the logical datasets utilized by the graph. In some examples, a parameter can be a hybrid parameter that includes both design time and run time portions.

In FIG. 5A, the FEED parameter is a design time parameter which affects the logical operation of the gather.mp sub-graph. For example, for one value of the FEED parameter, a sort component 516 in the first sub-graph 502 may sort the data that it receives in ascending order while another, different value of the FEED parameter may cause the sort component 516 to sort the data in descending order. In some examples, a dataflow graph which includes design time parameters is referred to as a "generic graph" since its logical operation changes based on the supplied value of the design time parameter.

The DATE parameter is a run time parameter which has no effect on the logical operation of the sub-graph 502 and is supplied on a job-by-job basis.

In some examples, commonly used sets of parameters for dataflow graphs are stored as "parameter sets" (sometimes referred to as "psets") which can be saved to disk and easily re-used. For example, in FIG. 5A, the first sub-graph 502 has three psets associated with it, PSET_mexico 518, PSET_canada 520, and PSET_usa 522. PSET_mexico 518 includes a commonly used FEED parameter value "mexico" and a commonly used DATE parameter value "today( )" which is a function that returns today's date. PSET_canada 520 includes a commonly used FEED parameter value "canada" and the commonly used DATE parameter value "today( )" PSET_usa 522 includes a commonly used FEED parameter value "usa" and the commonly used DATE parameter value "today( )" Similarly, the second sub-graph 504 has a single pset associated with it, PSET 523. PSET 523 includes the commonly used DATE parameter value "today( )" which is a function that returns today's date.

In some examples, prior to the execution of the dataflow graph 500 (e.g., as part of the execution of the computer program ecosystem to which the dataflow graph 500 belongs), one or more psets associated with the dataflow graph 500 (and its associated sub-graphs 502, 504) are identified, and a number of unique design time parameters in the one or more psets are determined. For each unique design time parameter for a given dataflow graph, a separate executable instance of the dataflow graph is instantiated.

For example, referring to FIG. 5B, for the dataflow graph 500 of FIG. 5B, three instances of the first sub-graph 502, gather.mp are instantiated (PSET_mexico->gather.mp 502a, PSET_canada->gather.mp 502b, PSET_usa->gather.mp 502c), each instance configured according to a different one of the three unique feed parameters in the psets of FIG. 5A: mexico, canada, and usa. Since the second sub-graph 504 is associated with only a single pset 523 that does not include any design time parameters, only a single instance (process.mp 504a) of the second sub-graph 504 is instantiated at execution time.

Once the appropriate instances of the sub-graphs 502, 504 are instantiated, the parameter value placeholders in the parameterized paths for the datasets are replaced with actual parameter values from the psets, resolving the paths to the physical locations of the datasets. For example, for the PSET_mexico->gather.mp instance 502a of the first sub-graph 502, the path for the first dataset 506 is resolved to /mexico/inv_031014 since the FEED parameter value is 'mexico' and the DATE parameter value is '031014.'

Once the dataflow graph 500, including its sub-graphs 502, 504, has been instantiated, and the physical paths to the dataflow graph's datasets have been resolved, the dataflow graph 500. During execution, the three instances 502a, 502b, 502c of the first sub-graph 502 read data from their respective input datasets, process the data, and store the processed data in the /trans_031014.dat physical file. Since the input dataset (e.g., DS4 512) for the instance 504a of the second sub-graph 502 resolves to the same physical file as the output dataset of the first sub-graph, the /trans_031014.dat physical file is read by the instance of process.mp and then processed and stored in the table 514.

Figure 6:
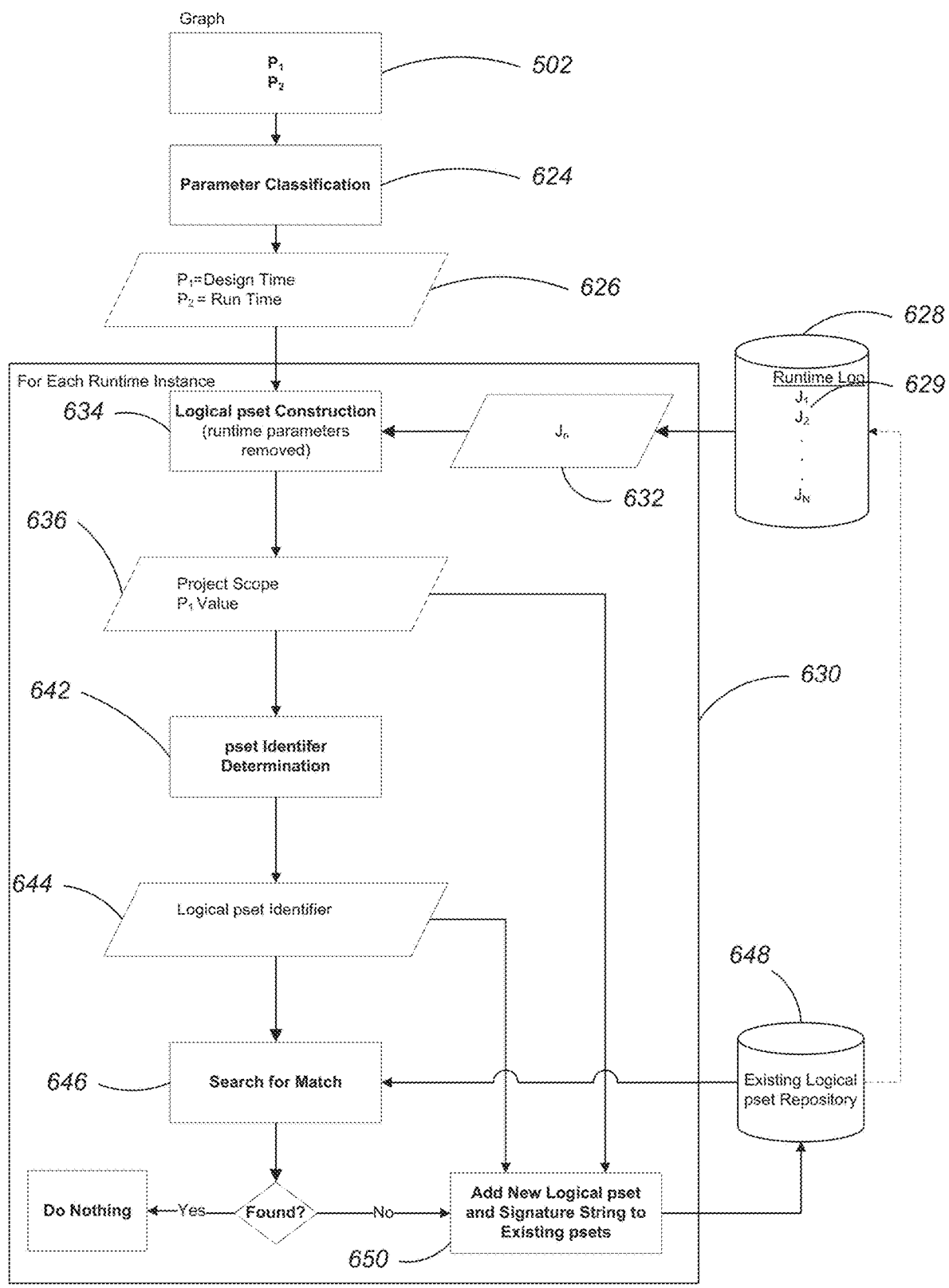
FIG. 6 is a flow chart for a runtime analysis of a computer program ecosystem.

FIG. 6 depicts an example approach to a runtime analysis of a computer program ecosystem. As noted above, a computer program ecosystem can be executed responsive to an execution command that receives parameter values as arguments. Because psets associated with such parameter values are not taken into account in a static analysis of the computer program ecosystem, the static analysis of the computer program ecosystem can sometimes be incomplete or incorrect. The results of a runtime analysis can be used to augment the results of a static analysis by accounting for sets of parameters identified in a runtime log associated with one or more executions of instances of the computer program ecosystem. Further description of a runtime analysis can be found in U.S. Patent Application Publication No. US 2016/0019057, the contents of which are incorporated here by reference in their entirety.

In a runtime analysis, an example computer program, such as a dataflow graph (e.g., the sub-graph 502 of FIG. 5A) includes two parameters, P1 and P2, each of which can be designated as either a design time parameter or a run time parameter. The runtime analysis makes use of a parameter classification 626 that specifies the classification of each parameter as either a design time parameter or a run time parameter. In some examples, the runtime analysis can include a parameter classification step 624. In some examples, the parameter are pre-classified.

The runtime analysis makes use of a runtime log data store 628 that includes one or more runtime logs 629, each including information associated with execution of one or more instances of the computer program ecosystem. The runtime logs 629 can include a record of an execution command that was used to instantiate one or more computer programs of the computer program ecosystem for execution. The execution command for a given log entry includes an identifier of the computer program and one or more parameter values that were supplied as arguments to the execution command. In some examples, a computer program is instantiated without accessing any parameter sets, but instead receives parameter values as arguments supplied to the execution command.

The parameter classification 626 and the runtime log data store 628 are provided to a processing loop 630 which, for each runtime log 629 in the runtime log data store 628, generates a new logical pset for the execution command, determines whether the new pset already exists in a repository 648 of existing logical psets, and adds the new logical pset to the repository 648 if it does not already exist.

Within the processing loop 630, a runtime log $J_n$ 632 from the runtime log data store 628 is analyzed according to the parameter classification 626 in a logical pset construction step 634 to generate a logical pset 636. In doing so, the logical pset construction step 634 analyzes the execution command included in the runtime log 632 to extract the parameter values that are included as arguments to the graph execution command. The logical pset construction step 634 then matches each extracted parameter value with a corresponding parameter in the parameter classification 626. If the logical pset construction step 634 determines that an extracted parameter value corresponds to a design time parameter in the parameter classification 626, then the logical pset construction step 634 includes the value of the extracted design time parameter in the logical pset 636. If the logical pset construction step 634 determines that an extracted parameter value corresponds to a run time parameter in the parameter classification 626, then the extracted parameter value is not included in the logical pset 636.

An identifier 644 of the logical pset 636 is determined 642 and compared 646 to identifiers of all psets in the repository 648 of existing logical psets. If the identifier 644 matches an identifier of at least one existing logical pset in the repository 648, then no action is taken, because a logical pset for execution command instantiation of the computer program already exists in the repository 648. If there is no match, the logical pset 636 and its identifier 644 are added as a new logical pset to the repository 648 of existing logical psets 648 by a new logical pset addition step 650.

Figure 7:
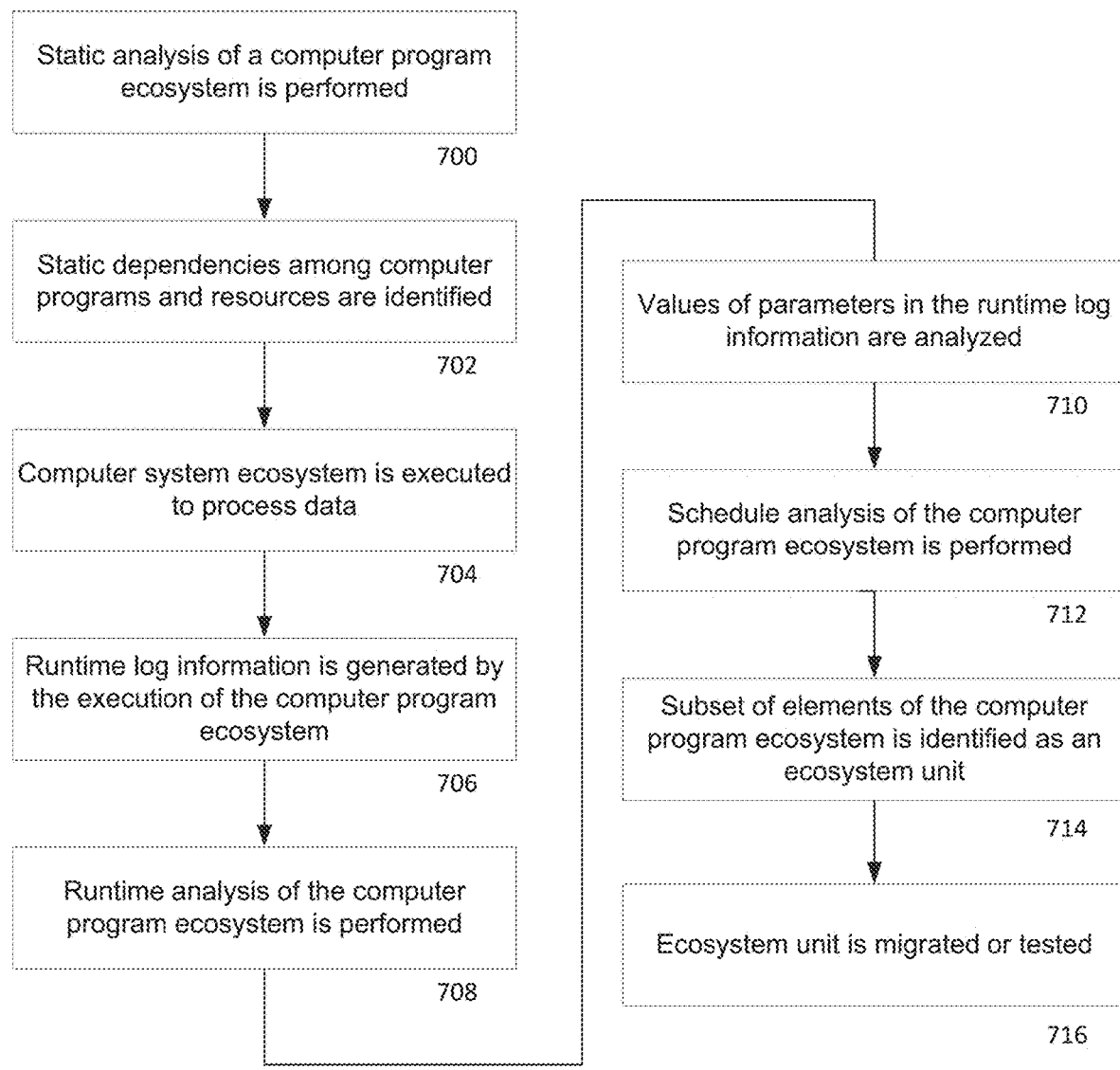
FIG. 7 is a flow chart.

Referring to FIG. 7, in an example method for analyzing a computer program ecosystem including multiple computer programs, a static analysis of the computer program ecosystem is performed (700). As part of the static analysis, static dependencies among the multiple computer programs and data resources associated with the computer program ecosystem are identified (702). For instance, the static dependencies can be identified based on resolved values of parameters in one or more parameter sets associated with the computer program ecosystem.

The computer program ecosystem is executed to process data records (704). For instance, one or more of the computer programs of the computer program ecosystem are instantiated according to values of parameters in one or more of the parameter sets associated with the computer program ecosystem, and the instantiated computer programs are executed to process the data. In some examples, executing the computer program ecosystem can include accessing one or more of the data resources associated with the computer program ecosystem, e.g., reading data from one or more of a file, a database, and an object; writing data to one or more of a file, a database, and an object; or both.

Runtime log information is generated by the execution of the computer program ecosystem (706). For instance, the runtime log information is written to a log file. The runtime log information can include values of parameters in one or more of the parameter sets associated with the computer program ecosystem. For instance, the runtime log information can include information indicative of the one or more instantiated computer programs that were executed during execution of the computer program ecosystem, information indicative of the one or more data resources that were accessed during execution of the computer program ecosystem.

A runtime analysis of the computer program ecosystem is performed (708). As part of the runtime analysis, the runtime log information is obtained. Also as part of the runtime analysis, the values of the parameters in the runtime log information are analyzed (710) to identify one or more of the elements of the computer program ecosystem that were utilized during execution of the computer program ecosystem, such as computer programs that were executed or data resources that were accessed during execution of the computer program ecosystem. For instance, runtime dependencies among the executed computer programs can be identified, e.g., based on the values of the parameters in the runtime log information. In some examples, the analysis of the values of the parameters in the runtime log information involves generalizing one or more of the values.

A schedule analysis of the computer program ecosystem is performed (712) to identify a computer program of the computer program ecosystem that has a schedule dependency on another computer program of the computer program ecosystem. For instance, the schedule analysis can obtain scheduling information from a scheduler and can identify a computer program that is scheduled to run after execution of another computer program has been completed.

A subset of the elements of the computer program ecosystem is identified as an ecosystem unit (714) based on the results of the static analysis, the results of the runtime analysis, and the results of the schedule analysis of the computer program ecosystem. For instance, the one or more computer programs that were executed and the one or more data resources that were accessed are included in the ecosystem unit along with other computer programs or data resources that have static dependencies on the executed computer programs or accessed data resources.

A system task is performed using the ecosystem unit (716). In some examples, the system task includes migrating the ecosystem unit from a first computing platform to a second computing platform. In some examples, the system task includes testing the ecosystem unit.

Figure 8:
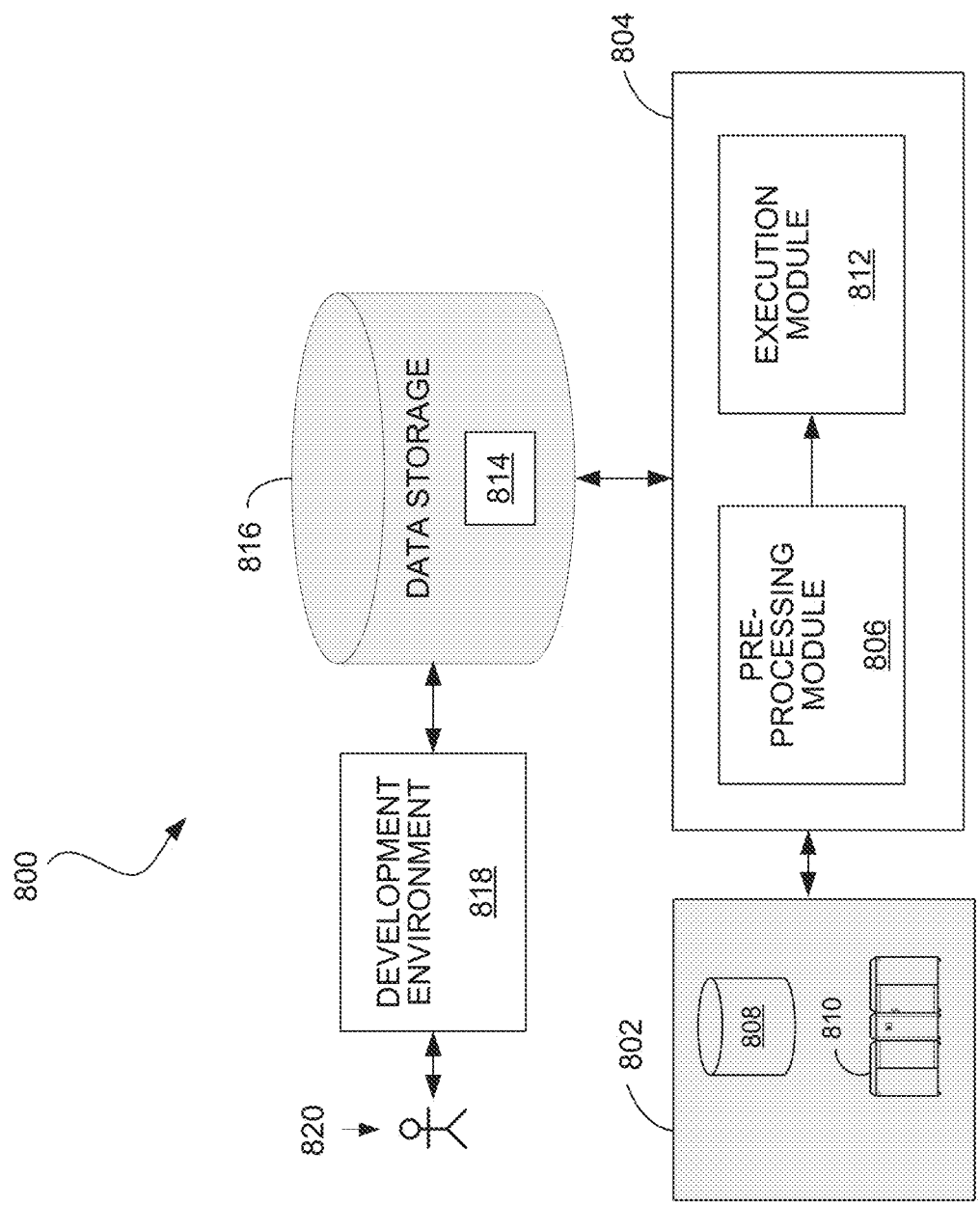
FIG. 8 is a diagram of a computing system.

FIG. 8 shows an example of a data processing system 800 for developing and executing dataflow graphs in which the techniques described here can be used. The system 800 includes a data source 802 that may include one or more sources of data such as storage devices or connections to online data streams, each of which may store or provide data in any of a variety of formats (e.g., database tables, spreadsheet files, flat text files, or a native format used by a mainframe computer). The data may be logistical data, analytic data or industrial machine data. An execution environment or runtime environment 804 includes a pre-processing module 806 and an execution module 812. The execution environment 804 may be hosted, for example, on one or more general-purpose computers under the control of a suitable operating system, such as a version of the UNIX operating system. For example, the execution environment 804 can include a multiple-node parallel computing environment including a configuration of computer systems using multiple processing units (such as central processing units, CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

Storage devices providing the data source 802 may be local to the execution environment 804, for example, being stored on a storage medium (e.g., hard drive 808) connected to a computer hosting the execution environment 804, or may be remote to the execution environment 804, for example, being hosted on a remote system (e.g., mainframe computer 810) in communication with a computer hosting the execution environment 804, over a remote connection (e.g., provided by a cloud computing infrastructure).

The pre-processing module 806 reads data from the data source 802 and prepares data processing applications (e.g. an executable dataflow graph) for execution. For instance, the pre-processing module 806 can compile the data processing application, store and/or load a compiled data processing application to and/or from a data storage system 816 accessible to the execution environment 804, and perform other tasks to prepare a data processing application for execution.

The execution module 812 executes the data processing application prepared by the pre-processing module 806 to process a set of data and generate output data 814 that results from the processing. The output data 814 may be stored back in the data source 802 or in a data storage system 816 accessible to the execution environment 804, or otherwise used. The data storage system 816 is also accessible to an optional development environment 818 in which a developer 820 is able to design and edit the data processing applications to be executed by the execution module 812. The development environment 818 is, in some implementations, a system for developing applications as dataflow graphs that include vertices (representing data processing components or datasets) connected by directed links (representing flows of work elements, i.e., data) between the vertices. For example, such an environment is described in more detail in U.S. Patent Publication No. 2007/0011668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS," the contents of which are incorporated herein by reference in their entirety. Dataflow graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes).

The pre-processing module 806 can receive data from a variety of types of systems that may embody the data source 802, including different forms of database systems. The data may be organized as records having values for respective fields (also called "attributes" or "columns"), including possibly null values. When first reading data from a data source, the pre-processing module 806 typically starts with some initial format information about records in that data source. In some circumstances, the record structure of the data source may not be known initially and may instead be determined after analysis of the data source or the data. The initial information about records can include, for example, the number of bits that represent a distinct value, the order of fields within a record, and the type of value (e.g., string, signed/unsigned integer) represented by the bits.

In other words, and generally applicable to executable dataflow graphs described herein, the executable dataflow graph implements a graph-based computation performed on data flowing from one or more input data sets of a data source 802 through the data processing components to one or more output data sets, wherein the dataflow graph is specified by data structures in the data storage 814, the dataflow graph having the nodes that are specified by the data structures and representing the data processing components connected by the one or more links, the links being specified by the data structures and representing data flows between the data processing components. The execution environment or runtime environment 804 is coupled to the data storage 814 and is hosted on one or more computers, the runtime environment 804 including the pre-processing module 806 configured to read the stored data structures specifying the dataflow graph and to allocate and configure system resources (e.g. processes, memory, CPUs, etc.) for performing the computation of the data processing components that are assigned to the dataflow graph by the pre-processing module 806, the runtime environment 804 including the execution module 812 to schedule and control execution of the computation of the data processing components. In other words, the runtime or execution environment 804 hosted on one or more computers is configured to read data from the data source 802 and to process the data using an executable computer program expressed in form of the dataflow graph.

The approaches described above can be implemented using a computing system executing suitable software. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of graphs. The modules of the program (e.g., elements of a graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments have been described. Nevertheless, it will be understood that various modifications may be made without departing from the spirit and scope of the invention. For example, some of the steps described above may be order independent, and thus can be performed in an order different from that described.

Other implementations are also within the scope of the following claims.

What is claimed is:

1. A computer-implemented method for analyzing a computer program ecosystem including multiple computer programs, the method including:
performing a static analysis of the computer program ecosystem, including identifying static dependencies among elements of the computer program ecosystem based on values of parameters in one or more parameter sets associated with the computer program ecosystem, the elements of the computer program ecosystem including the multiple computer programs of the computer program ecosystem and data resources associated with the computer programs;
performing a runtime analysis of the computer program ecosystem, including identifying one or more of the elements of the computer program ecosystem that were utilized during execution of the computer program ecosystem to process data records;
performing a schedule analysis of the computer program ecosystem, including identifying a computer program of the computer program ecosystem that has a schedule dependency from another computer program of the computer program ecosystem;
identifying a subset of the elements of the computer program ecosystem as an ecosystem unit based on the results of the static analysis, the runtime analysis, and the schedule analysis; and
migrating the ecosystem unit from a first computer system to a second computer system, testing the ecosystem unit, or both.

2. The method of claim 1, in which performing the runtime analysis includes obtaining runtime log information generated by execution of the computer program ecosystem; and analyzing the runtime log information to identify the one or more elements of the computer program ecosystem that were utilized during execution of the computer program ecosystem.

3. The method of claim 2, in which analyzing the runtime log information includes analyzing the values of parameters in the runtime log information to identify one or more computer programs that were executed during execution of the computer program ecosystem.

4. The method of claim 3, in which identifying the subset of elements as the ecosystem unit includes identifying the computer programs that were executed during execution of the computer program ecosystem as parts of the ecosystem unit.

5. The method of claim 3, in which identifying one or more computer programs of the computer program ecosystem that were executed during execution of the computer program ecosystem includes identifying runtime dependencies among the executed computer programs.

6. The method of claim 3, in which identifying the runtime dependencies among the executed computer programs includes identifying the runtime dependencies based on the values of the parameters in the runtime log information.

7. The method of claim 3, in which analyzing the values of the parameters in the runtime log information includes generalizing one or more of the values.

8. The method of claim 3, in which analyzing the runtime log information includes analyzing the values of parameters in the runtime log information to identify one or more data resources that were accessed during execution of the computer program ecosystem.

9. The method of claim 8, including analyzing the values of the parameters in the runtime log information to determine the name of each data resource that was accessed during execution of the computer program ecosystem.

10. The method of claim 8, in which identifying the subset of elements as the ecosystem unit includes identifying the data resources that were accessed during execution of the computer program ecosystem as parts of the ecosystem unit.

11. The method of claim 1, in which identifying a subset of the elements of the computer program ecosystem as an ecosystem unit includes including, in the ecosystem unit, the one or more elements that were utilized during execution of the computer program ecosystem.

12. The method of claim 1, in which performing a schedule analysis includes obtaining schedule information from a scheduler, in which the scheduler is distinct from the computer program ecosystem.

13. The method of claim 1, in which performing a schedule analysis includes identifying a first computer program of the computer program ecosystem that is scheduled to be executed after execution of a second computer program of the computer program ecosystem.

14. The method of claim 13, in which identifying the subset of elements as the ecosystem unit includes identifying the first computer program and the second computer program as part of the ecosystem unit.

15. The method of claim 1, including executing the computer program ecosystem to process data.

16. The method of claim 15, in which executing the computer program ecosystem includes instantiating one or more of the computer programs of the computer program ecosystem according to values of parameters in one or more of the parameter sets associated with the computer program ecosystem.

17. The method of claim 16, in which executing the computer program ecosystem includes executing the one or more instantiated computer programs to process the data.

18. The method of claim 17, in which the runtime log information includes information indicative of the one or more executed instantiated computer programs.

19. The method of claim 15, in which executing the computer program ecosystem includes accessing one or more of the data resources associated with the computer program ecosystem.

20. The method of claim 19, in which the runtime log information includes information indicative of the one or more accessed data resources.

21. The method of claim 19, in which accessing a data resource associated with the computer program ecosystem includes reading data from one or more of a file, a database, and an object.

22. The method of claim 19, in which accessing a data resource associated with the computer program ecosystem includes writing data to one or more of a file, a database, and an object.

23. The method of claim 19, in which executing the computer program ecosystem includes generating the runtime log information.

24. The method of claim 23, in which generating the runtime log information includes writing the runtime log information to a log file.

25. The method of claim 1, in which the one or more computer programs include dataflow graphs.

26. A computer system for analyzing a computer program ecosystem including multiple computer programs, the computer system including:
one or more processors coupled to a memory, the one or more processors configured to:
perform a static analysis of the computer program ecosystem, including identifying static dependencies among elements of the computer program ecosystem based on values of parameters in one or more parameter sets associated with the computer program ecosystem, the elements of the computer program ecosystem including the multiple computer programs of the computer program ecosystem and data resources associated with the computer programs;
perform a runtime analysis of the computer program ecosystem, including identifying one or more of the elements of the computer program ecosystem that were utilized during execution of the computer program ecosystem to process data records;
perform a schedule analysis of the computer program ecosystem, including identifying a computer program of the computer program ecosystem that has a schedule dependency from another computer program of the computer program ecosystem;
identify a subset of the elements of the computer program ecosystem as an ecosystem unit based on the results of the static analysis, the runtime analysis, and the schedule analysis; and
migrate the ecosystem unit from a first computer system to a second computer system, testing the ecosystem unit, or both.

27. A non-transitory computer readable medium storing instructions for causing a computer system to analyze a computer program ecosystem including multiple computer programs, the instructions causing the computer system to:
perform a static analysis of the computer program ecosystem, including identifying static dependencies among elements of the computer program ecosystem based on values of parameters in one or more parameter sets associated with the computer program ecosystem, the elements of the computer program ecosystem including the multiple computer programs of the computer program ecosystem and data resources associated with the computer programs;
perform a runtime analysis of the computer program ecosystem, including identifying one or more of the elements of the computer program ecosystem that were utilized during execution of the computer program ecosystem to process data records;
perform a schedule analysis of the computer program ecosystem, including identifying a computer program of the computer program ecosystem that has a schedule dependency from another computer program of the computer program ecosystem;
identify a subset of the elements of the computer program ecosystem as an ecosystem unit based on the results of the static analysis, the runtime analysis, and the schedule analysis; and
migrate the ecosystem unit from a first computer system to a second computer system, testing the ecosystem unit, or both.

28. A computer system for analyzing a computer program ecosystem including multiple computer programs, the computer system including:
means for performing a static analysis of the computer program ecosystem, including identifying static dependencies among elements of the computer program ecosystem based on values of parameters in one or more parameter sets associated with the computer program ecosystem, the elements of the computer program ecosystem including the multiple computer programs of the computer program ecosystem and data resources associated with the computer programs;
means for performing a runtime analysis of the computer program ecosystem, including identifying one or more of the elements of the computer program ecosystem that were utilized during execution of the computer program ecosystem to process data records;
means for performing a schedule analysis of the computer program ecosystem, including identifying a computer program of the computer program ecosystem that has a schedule dependency from another computer program of the computer program ecosystem;
means for identifying a subset of the elements of the computer program ecosystem as an ecosystem unit based on the results of the static analysis, the runtime analysis, and the schedule analysis; and
means for migrating the ecosystem unit from a first computer system to a second computer system, testing the ecosystem unit, or both.

* * * * *